United States Patent [19]

Keech et al.

[11] Patent Number: 4,468,962
[45] Date of Patent: Sep. 4, 1984

[54] ENERGY LOSS DETECTION SYSTEM

[75] Inventors: David A. Keech; Robert T. Kirchner, both of Three Rivers; Nicholas M. Vander Wal, Kalamazoo; John E. Sorenson, Three Rivers, all of Mich.; Mark D. Driscoll, Milton, Fla.

[73] Assignee: Armstrong International, Inc., Three Rivers, Mich.

[21] Appl. No.: 355,054

[22] Filed: Mar. 5, 1982

[51] Int. Cl.³ .............................................. G01F 15/08
[52] U.S. Cl. .......................................... 73/200; 55/270
[58] Field of Search .................. 73/200, 204; 55/414, 55/418, 419, 446, 465, 270, 335, 308; 122/489, 490

[56] References Cited

U.S. PATENT DOCUMENTS

| | | | |
|---|---|---|---|
| 426,880 | 4/1890 | Taylor | 55/446 X |
| 3,715,870 | 2/1973 | Guzick | 55/502 X |
| 3,920,422 | 11/1975 | Pircon | 55/90 |
| 4,149,557 | 4/1979 | Keech et al. | 137/185 |
| 4,297,116 | 10/1981 | Cusick | 55/419 X |
| 4,305,548 | 12/1981 | Miner et al. | 55/355 X |

Primary Examiner—Gerald Goldberg
Assistant Examiner—Brian R. Tumm
Attorney, Agent, or Firm—Flynn, Thiel, Boutell & Tanis

[57] ABSTRACT

An energy loss detecting apparatus for measuring the rate of flow of the vapor phase of a bi-phase fluid flow, in the presence of an unknown quantity of the liquid phase, by separating the vapor phase from the liquid phase and producing a signal representing the vapor phase flow rate. The apparatus includes a hollow separator casing provided with a tube communicating with at least one of the inlet opening and outlet opening of the casing and facing thereinto. A wall seals the interior of the tube from the interior of the casing except at reduced diameter holes in the wall, the diameter of the holes being less than the inside diameter of the tubes at the wall. Energy loss due to a faulty steam trap is measurable by interposing the vapor flow rate measuring apparatus in a steam line between a steam consuming device and the steam trap.

9 Claims, 7 Drawing Figures

ENERGY LOSS DETECTION SYSTEM

FIELD OF THE INVENTION

This invention relates to a system for detecting vapor phase loss, in a bi-phase fluid circuit, such as in a steam circuit.

BACKGROUND OF THE INVENTION

The present invention was developed in view of a vexing energy loss problem in steam systems, but is not limited to that environment.

In conventional systems, as steam transfers its heat energy to a load it condenses. A steam trap discharges this condensate, while retaining the steam within the system. However, as the steam trap wears out, it increasingly loses steam and wastes energy.

Three known methods have commonly been used in an attempt to determine the steam loss of a steam trap.

1. Visual requires the discharge of the trap to the atmosphere for observation. However, atmospheric discharge is not always possible, due to the way that the trap has been installed into a condensate return system.

Moreover, with several different types of steam traps on the market, visual observation requires considerable training and skill. While it may be possible to detect a gross trap failure, estimating the magnitude of any steam losses cannot be done accurately as the following table illustrates (in which table #/hr. indicates pounds per hour)

| Trap at 150 psig Discharges | At Atmospheric Pressure Mass Flow | Discharge Changes to Volume Flow |
|---|---|---|
| 1. 82 #/hr. Cond. | 68.6 #/hr. Cond. | 1.15 cu. ft./hr. Cond. |
| 0 #/hr. Steam | 13.4 #/hr. Steam | 360 cu. ft./hr. Steam |
| 2. 50 #/hr. Cond. | 41.6 #/hr. Cond. | .695 cu. ft./hr. Cond. |
| 5 #/hr. Steam | 13.4 #/hr. Steam | 360 cu. ft./hr. Steam |

In the table above, Trap 1 has no steam loss, but actually discharges a considerable amount of steam at atmospheric pressure due to flashing of the condensate as the pressure is reduced. As the human eye actually sees a volume flow, in the above example a large cloud of steam and a few drops of water would be seen.

On the other hand, Trap 2, which is defective and has a steam loss, discharges the same volume of steam as Trap 1 but a somewhat smaller volume of condensate. However, the human eye would be very hard pressed to determine which of these two traps actually had a steam loss.

2. In some areas it has been common practice to test traps by reading upstream and downstream trap temperatures with a pyrometer. If the temperature difference is very high, the trap has been considered satisfactory, while if the temperature difference is very low, the trap has been considered defective.

This tends to be a very dubious method as the outlet temperature follows the saturation temperature/pressure relation for steam. A trap with a high rate of steam loss, discharging to a much lower pressure, will display a very high temperature difference. On the other hand, a good trap, discharging through a very low pressure difference, will display very low temperature difference. In actual field service with a condensate return system, the trap outlet pressure is seldom, if ever, known. Accordingly, such temperature difference readings can be highly misleading as to the condition of the trap.

3. A highly trained person using a stethoscope or an ultrasonic device can inspect a trap for steam loss. However, considerable skill and training is required to understand the normal mode of operation of all the various available traps and to be able to distinguish abnormal operation. Sound devices generally can only be used to make a good/bad judgment of trap operation, and cannot accurately quantify the magnitude of a steam loss.

Accordingly, such known prior methods have not been entirely satisfactory.

Energy loss detecting apparatus, which is free of the foregoing limitations of the above-discussed known prior methods, was developed in a continuing program of development by personnel of the present Assignee corporation and is disclosed in U.S. Pat. No. 4,305,548 issued Dec. 15, 1981 and in PCT application No. U.S. 81/00025 filed Jan. 9, 1981 which was timely converted to U.S. National application Ser. No. 303,251 on Sept. 2, 1981. Such apparatus included a separator casing provided with baffles for the purpose of separating incoming steam and condensate flow and a flow sensor in the steam flow therein, the separator casing being interposable in a steam flow path between, for example, a steam consuming device fed from a steam source and a steam trap downstream of the consuming device.

While the apparatus disclosed in the aforementioned patent and applications has proved to be generally satisfactory, the present invention has been developed as part of a continuing development program to improve the structure and performance thereof.

Accordingly, the objects of the present invention include provision of energy loss detecting apparatus which enhances separation and permits substantial reduction in separator volume for high steam flow rates without loss of measurement reliability, which improves measurement reliability in the presence of pressure irregularities in the flow path outside the separator, and which reduces degradation of steam flow measurement liability due to collection of liquid droplets on interior parts of the separator.

SUMMARY OF THE INVENTION

The objects and purposes of the invention are met by providing an energy loss detecting apparatus for measuring the rate of flow of the vapor phase of a bi-phase fluid flow, in the presence of an unknown quantity of the liquid phase, by separating the vapor phase from the liquid phase and producing a signal representing the vapor phase flow rate. The apparatus includes a hollow separator casing provided with a tube communicating with at least one of the inlet opening and outlet opening of the casing and facing thereinto. Wall means seal the interior of the tube from the interior of the casing except at reduced diameter holes in the wall means, the diameter of the holes being less than the inside diameter of the tubes at the wall means. Energy loss due to a faulty steam trap is measurable by interposing the vapor flow rate measuring apparatus in a steam line between a steam consuming device and the steam trap.

DETAILED DESCRIPTION

Figures 1, 3, 4, 6:
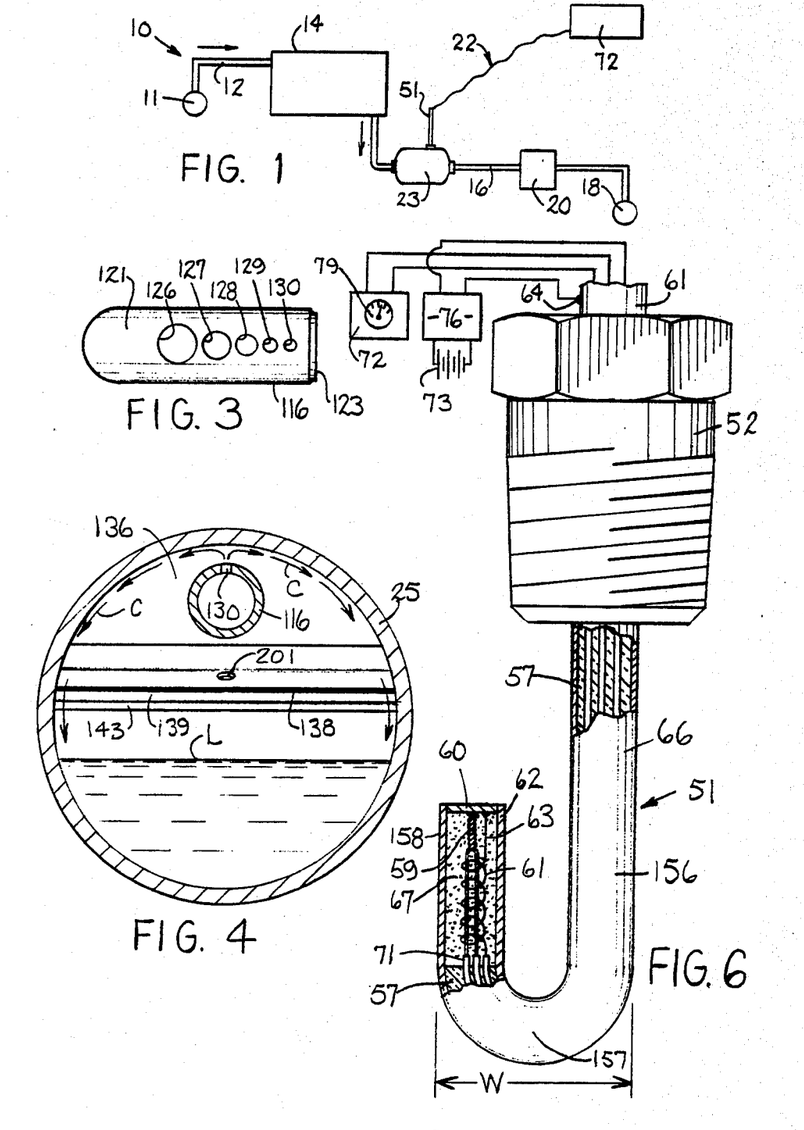
FIG. 1 is a schematic diagram of a steam circuit incorporating an energy loss detection system embodying the invention.
FIG. 3 is a view of the holes in the outlet segment of the inlet tube, taken substantially in the direction III, namely from the top, in FIG. 2.
FIG. 4 is a sectional view substantially taken on the line IV—IV of FIG. 2.
FIG. 6 is an enlarged, partially broken, fragmentary side view of the probe of FIG. 2.

FIG. 1 discloses a bi-phase fluid circuit 10 comprising a conventional steam source 11 applying steam through a conduit 12 to a steam consumer device, or load, 14. In normal operation, the heat energy in the steam is transferred to the consumer device 14. The consumer device 14 may be a heat exchanger, or other device in which heat is converted to mechanical, electrical or other energy forms.

A further conduit 16 connects the return side of the heat exchanger to a return main 18 leading back to the steam source 11, to enable steam source 11 to reheat the returning condensate to steam. The steam source 11 may include, for example, a conventional boiler and fluid circulating pump.

A steam trap 20, in the return conduit 16 from the steam consumer device 14, may be of any conventional type, for example as in U.S. Pat. No. 4,149,557, issued Apr. 17, 1979.

As heat in the steam is transferred to the consumer device 14, the steam condenses and is released to the conduit 16 as condensate. The steam trap 20 is to discharge this condensate to the return main 18, but prevent escape of steam, to maximize the transfer of heat energy to the consumer device 14 by maximizing conversion of steam to condensate in the consumer device.

To the extent above described, the steam circuit 10 is conventional.

The steam trap may become damaged or may wear, permitting steam to be lost. Applicants have recognized that steam flow to the steam trap is thus a measure of the energy loss, or waste, of the trap.

The present invention measures the energy (steam) loss due to a defect in the steam trap 20, by an apparatus 22. The apparatus 22 includes a sensing unit 23 interposed in the conduit 16 between the steam consumer device 14 and the steam trap 20. While shown in FIG. 1 as separate elements, it is contemplated that the sensing unit 23 may be integrated with the steam trap and share a common casing. The sensing unit 23 includes a separator 24 (FIG. 2) having a hollow, elongated (here for example horizontally) casing 25. An upstanding baffle 27 fixed within the casing 25 divides it into side-by-side inlet and outlet chambers 31 and 32. The casing 25 has inlet and outlet openings, here conventional pipe fittings 33 and 34, fixed to the peripheral wall of casing 25 and opening respectively into the inlet and outlet chambers 31 and 32. The inlet and outlet openings 33 and 34 are spaced above the bottom 37 and below the top 38 of casing 25.

Figures 2, 5:
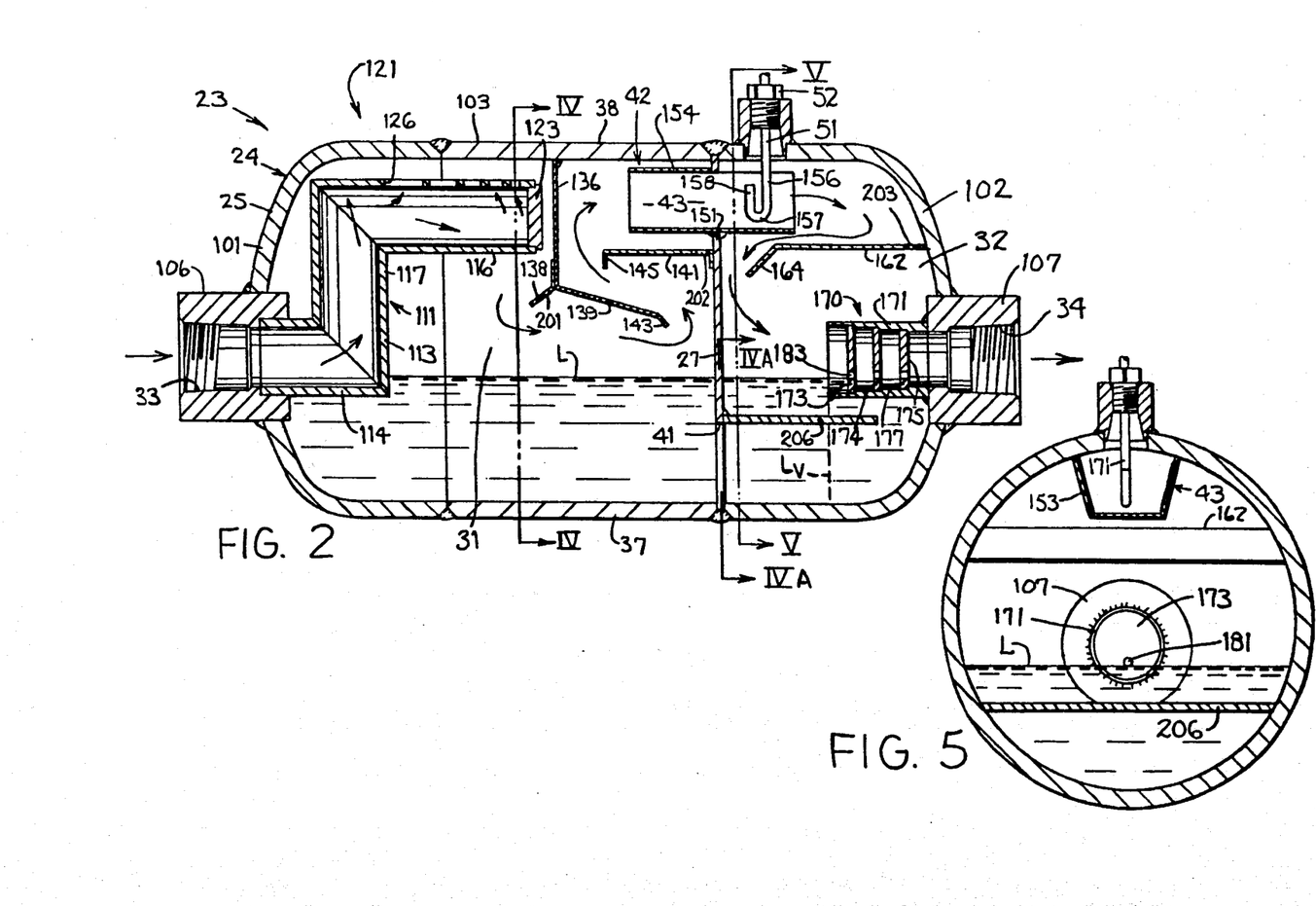
FIG. 2 is an enlarged, fragmentary, central cross-sectional view of a separator apparatus of the system of FIG. 1.
FIG. 5 is a sectional view substantially taken on the line V—V of FIG. 2.
Figure 4A:
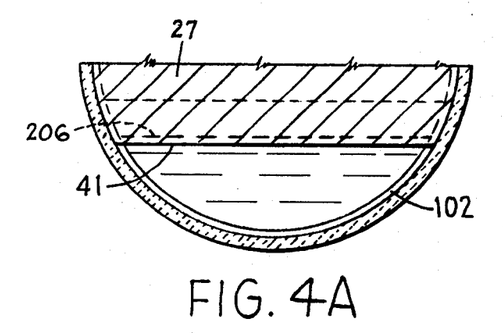
FIG. 4A is a fragmentary sectional view substantially taken on the line IV A–IV A in the central plane of baffle 27.

Thus, the bottom portion of the casing 25, below the inlet and outlet openings 33 and 34, is normally filled with condensate at a level L. The baffle 27 extends downward below the inlet and outlet openings 33 and 34 and hence below the normal level L to block vapor flow through the bottom portion of casing 25 between the openings 33 and 34. However, an opening 41 between the baffle 27 and the bottom 37 of casing 25, below level L, permits condensate flow past the baffle 27.

Above the inlet and outlet openings 33 and 34, a vapor port 42 provides gas flow communication between the inlet and outlet chambers 31 and 32 through the upper portion of the baffle 27. In the preferred embodiment shown, the vapor port 42 includes an enlongate transverse duct 43 penetrating the baffle 27 and providing a longitudinally extending vapor flow path through the casing 25. The vapor port is spaced well above the residual liquid level L and inlet and outlet openings 33 and 34.

A vapor flow sensing probe 51 is fixed at 52 on the top portion 38 of casing 25 and extends through the casing wall into the vapor flow through duct 43. The probe senses the velocity of the vapor and provides an output signal which is a function of vapor phase flow rate.

FIG. 6 schematically discloses a probe 51 of the heater-thermocouple type, including a sensing thermocouple 59 heated above ambient temperature by an electric resistance heating element 61. As vapor velocity past the probe increases, the vapor flow carries away an increasing amount of the heat generated by heater 61 and thereby reduces the temperature at, and output signal of, sensing thermocouple 59. Accordingly, the output signal of the thermocouple 59 varies with changes in vapor velocity through port 42.

The probe 51 conventionally includes a thermally conductive outer skin 66 (e.g., of metal), a thermally conductive but electrically insulative filling 67 surrounding heater 61 and sensing thermocouple 59, as well as conventional electrical insulation 71 on the conductors leading to the heater and thermocouple. The probe, beyond the thermocouple 59 and heater 61, may be filled with a conventional electrical and thermal insulating barrier 57. The thermocouple 59 is repeatably located along the length of the probe by abutting (and if desired by attachment to) a conductive (e.g. metal) end plate 60 fixed in the free end 62 of the tubular outer skin 66. The metal end plate 60 is in electrically conductive contact with the tubular outer skin 66 which is also electrically conductive. Accordingly, the remote end conductor 63 of the heater 61 can be, if desired, conductively connected, as by soldering or the like, to the end plate 60. The end plate 60 and electrically conductive outer skin 66 thus serve as one of the two conductors for the heater for a distance along the length of the probe to any convenient location 64, such as at the outermost end of the probe. In the embodiment shown, the means 52 for fixing the probe on the casing 25 takes the form of a conventional fitting 52 threadable into a suitable boss on the casing 25. The fitting 52 may conductively connect the probe tube 66 to the casing 25 if desired or may be of insulative material or have an insulative insert if desired.

In FIG. 6, heater 61 is energized from a conventional electric power source 73. The electric power fed to the heater is preferably monitored, as by a conventional watt meter 76. The electrical output of the thermocouple 59 is fed to a suitable readout and/or alarm circuit 72, here including a volt meter 79. With a given electrical input to the heater 61, as ascertained from the watt meter 76, the meter 79 may be calibrated, for a given probe 51 and separating unit 24, in any desired units if flow measurement, such as CFM, SCFM, pounds per hour, feet per second, cost per unit time, etc. Instead of, or in addition to, a continuous readout device such as meter 79, a two-state output or alarm device (not shown) may be employed to produce a good/-bad judgment in response to the output of probe 51. Readout systems of other types, such as electronic, hydraulic, etc. may be employed.

In general, the separator 24 separates the two phases of the bi-phase fluid entering through its inlet opening 33 and permits recombination for discharge from its outlet opening 34. The entering bi-phase fluid (e.g. condensate and steam) expands into the substantially greater cross-sectional area of the casing which expansion substantially decreases the velocity of the bi-phase fluid within the separator and allows the liquid phase to drop into the lower portion of the separator casing, through the lower opening 41 of the baffle and out the outlet opening 34. Liquid in the bottom of the casing 25 seals the opening 41 against vapor phase flow therethrough. Accordingly, the vapor phase can only flow through the top portion of the separator casing 25, through the vapor port 42, to the outlet opening 34.

Accordingly, the separator is a passive element within the conduit 16. The flow rate through the separator 23 is thus a function of the bi-phase fluid circuit 10 in which it is installed, rather than of the separator structure itself.

Applicants' apparatus can monitor the magnitude of the steam loss from trap 20. Locating the separator 24 between the steam consumer 14 and steam trap 20 has several advantages. First, the separator, being upstream of the trap, always remains at the pressure of steam source 11, which avoids problems resulting from flashing of condensate to steam as the result of a pressure drop. Second, high measurement accuracy is achieved because any steam passing through the steam consumer to the trap is an energy loss. More particularly, in theory all heat energy should be used in the heat exchanger and none lost downstream. Such steam loss must pass through the separator 24 of sensing unit 23 and thereby be measured, independent of which phase it is in when discharged from the trap 20. Accordingly, it is immaterial whether the trap defect is such that it discharges this steam directly as a live steam loss, or permits same to condense in the trap and be discharged as condensate.

The probe 51 is here removably threaded in a boss on the top portion 38 of casing 25. When measurement is not required at a given separator 24, a conventional threaded plug (not shown) can replace the removable probe. The same removable probe can then be time shared by other separators 24.

The vapor flow measuring portion of the apparatus disclosed is also usable for other steam flow measurements, for example of steam flow into or out of control valves, bypass valves, heat exchangers, steam traps and so forth. Use in refrigeration systems for vapor phase refrigerant flow measurement is also contemplated.

Turning now to the portion of the apparatus with which the present invention is primarily concerned, the separator casing 25 (FIGS. 2-4) here comprises end cups 101 and 102 joined, preferably by welding, to a cylindrical center shell 103. The baffle 27 is conveniently welded between the ends of the shell 103 and outlet end cap 102. The inlet and outlet openings 33 and 34 preferably are in conventional threaded fittings welded to the end cups 101 and 102, respectively. In the embodiment shown, the inlet and outlet openings 33 and 34 are, for convenient insertion in an existing pipeline, preferably coaxially aligned at a height intermediate the top and bottom 38 and 37 of the casing, conveniently somewhat below the center of the casing.

In the preferred embodiment shown, a pre-separator unit 111 is provided for separating a portion of the steam and condensate entering through the inlet 33 prior to entry thereof into the inlet chamber 31 proper. It has been found that this pre-separator 111 is particularly useful in separators having relatively high flow rates, such as 5,000 to 20,000 pounds per hour of combined steam and condensate flow. For such relatively large flow rates, it has been found that the pre-separator 111 allows a reduction of separator casing size to, typically, one-half the diameter that otherwise would be required.

The pre-separator comprises an inlet tube 113 having inlet and outlet segments 114 and 116 connected by an intermediate portion 117. The outlet segment 116 preferably extends substantially parallel to the longitudinal axis of the casing 25 and to the axes of the inlet and outlet openings 33 and 34. The outlet segment 116 is intended to be spaced well above the normal liquid level L, with its top wall 121 near but spaced below the top wall 38 of the casing. To this end, and with the inlet 33 at the liquid level L and hence spaced well below the casing top wall 38, the intermediate portion 113 is angled (in the preferred embodiment shown at right angles) to the inlet and outlet segments 114 and 116 which it connects. In consequence, the inlet tube 113 is essentially Z-shaped in elevation, as seen in FIG. 2, such that the intermediate portion 117 supports the outlet segment 116 well above the inlet segment 114. The rightward facing downstream end of the outlet segment 116 is completely closed by an end wall 123.

The top wall 121 of the outlet segment 116 is provided with a series of holes 126-130 beginning somewhat downstream of the inlet end of the outlet segment 116 and running substantially to the end wall 123. The diameters of the holes 126-130 are progressively reduced in the direction of the end wall 123, such that the area of each of the holes 127-130 is substantially equal to one-half the area of the immediately preceding one of the holes 126-129, respectively. While five holes are here shown and have proved to be a convenient number, this number may vary, for example from 3 to 8 holes, depending on the size of the separator. The holes 126-130 face toward the opposed interior surface of the casing top wall 38.

In typical operation, a stream of mixed steam and condensate droplets enters rightwardly through the inlet opening 33 at relatively high velocity into the inlet segment 114, strikes the rightward wall thereof and is deflected upward (substantially in accord with the flow direction indicated by the arrows in FIG. 2). The upwardly deflected flow strikes the top wall 121 of outlet segment 116 and is deflected, again, rightward and somewhat downward to thereafter strike the end wall 123. The high velocity and hence momentum of the entering stream is, through these multiple deflections, converted to a correspondingly high static pressure progressively along the length of the inlet tube. The steam component, having less mass per unit volume, earlier loses velocity and gains static pressure and it is thus the steam component of the mixture which tends to first exit from the inlet tube. Accordingly, it is primarily steam which exits through the first, larger diameter holes 126 and 127.

On the other hand, due to its greater mass, the liquid component of the incoming stream tends to continue on through the full length of the outlet segment 116 to strike the end wall 123, and there pile up at a high static pressure which tends to drive the condensate upward at the end wall 123 through the nearest hole 129, or holes 129 and 130. Depending on the amount of condensate present, same tends to exit in a solid stream substantially or completely filling the cross section of at least hole 130 and in some instances hole 129 and possibly hole 128. The top wall 121 of outlet segment 116 and the adjacent wall of the intermediate portion 117 tend to deflect the liquid component of the stream tends downward away from, rather than up toward or through, the initial large diameter holes 126 and 127.

In summary then, the earlier build-up of static pressure in the steam component of the mixture tends to drive it out of initial large diameter holes 126 and 127 while the retained momentum of the directed heavier liquid component tends to cause it to impact against the end wall 123, there to in effect have its momentum, or velocity pressure, thereby converted to static pressure driving it up and out through the adjacent small diameter holes 130 and 129. Little steam tends to escape through the smaller diameter holes 129 and 130 adjacent the end wall 123 for reasons including the much easier path of escape provided by the substantially larger diameter upstream holes 126 and 127 and the relatively very small cross-sectional passage offered to steam by the holes 129 and 130, which small diameter is further reduced or eliminated when such holes are occupied by an upward fountain of condensate pressed therethrough.

Therefore, whereas steam and condensate may enter the inlet 133 in a substantially homogeneous mix of steam and flying condensate droplets, such mixture tends to exit from the outlet segment 116 as steam without water droplets at one part of outlet segment 116 (large holes 126 and 127) and as a solid stream, or fountain, of condensate liquid at a different portion of the outlet segment 116 (small holes 129 and 130 offset to the right of the steam outlet holes 126 and 127). Accordingly, a substantial degree of pre-separation of the vapor and liquid phases of the inlet mixture is achieved prior to entry into the inlet chamber 31 of the casing itself.

Depending on the relative amounts of steam and condensate in the incoming stream at any given moment, the roles of the intermediate holes 127–129 may change between those of steam exit and condensate exit. Nevertheless, in the orientation shown in FIGS. 2 and 3, steam tends to exit from the leftward end of the series of holes and condensate from the rightward end. Moreover, the relatively even spacing and gradual diameter reduction in the series of holes allows the apparatus to readily and instantaneously adapt itself to wide changes in the relative percentages of steam and condensate in the incoming stream. This more than makes up for any tendency toward simultaneous exit from a given one of the middle holes, say hole 128, of a small portion of the steam and condensate flow in a still-mixed condition.

The disposition of the holes 126–130 in close spaced opposition to the peripheral wall, particularly the top wall 38, of the casing 25 tends to cause the condensate exiting from holes 129 and 130 as fountains or streams to strike the inner surface of the casing peripheral wall and then flow downward, adhering to the side walls of the casing, into the liquid at the bottom of the casing, as indicated by arrows C. This assists in maintaining the initial separation of a portion of the condensate from a portion of the steam, established by the pre-separator unit 11 as above described.

A substantially vertical plate 136 is fixed, as by welding, to the interior casing wall intermediate the ends of the center shell 103 thereof and depends from the top casing wall 38 down past the closed end 123 of the pre-separator unit 111, in horizontally close spaced relation thereto, to a point spaced above the liquid level L. The plate 136 (FIGS. 2 and 4) extends the full width of the casing and positively prevents any impact splash or misdirected fountain components of condensate emerging from the pre-separation unit 11 from carrying rightwardly into the area of the duct 43.

At the bottom edge of the depending plate 136 there are fixed downwardly angled flanges 138 and 139 angled upstream and downstream (left and right in FIG. 2) but still spaced well above the liquid level L. The rearward directed flange 138 deflects condensate droplets falling downward through space or running downward along the left surface of the plate 136 so that they tend to fall in the liquid to the left of the baffle plate 136. Steam exiting from the unit 111 is thus free to flow downward along the flanges 138 and 139 above the liquid level L toward and upward along the main baffle 27. The downward sloped surfaces of flanges 138 and 139 and the plate 136 provide additional surfaces on which airborn droplets may come to rest, and be directed downward to the condensate bath, rather than continue on in the steam flow toward the duct 43.

A ledge 141 extends horizontally upstream leftward from the baffle 27 in spaced relation between the bottom of duct 43 and flange 139, terminating in spaced relation from the depending plate 136 to form therewith a sinuous flow path for steam moving toward the duct 43 from the level L of liquid condensate in the bottom of the casing, which sinuous flow path is generally indicated by the arrows in FIG. 2.

The flange 139 and the flange 141 each have more or less angularly depending, relatively short end flanges contributing to the sinuous character of the flow path upward therepast and each forming a droplet catch edge. More particularly as to the latter, heavier droplets of condensate entrained in the steam flow are, because of their greater mass, less able to make the sharp turns required by the sinuous path past flanges 139 and 141 and hence are more likely to collide with and catch on the depending end flanges 143 and 145 and so tend to become entrapped thereby and catch thereon. The end flanges 143 and 145 also form drip edges such that condensate droplets formed thereon tend to drip downward therefrom into the liquid bath at L. The edge flange 145 overlies the midportion of the flange 139 so that droplets falling from the former do not directly strike the liquid surface at L from a substantial height so as to tend to splash, but rather fall a short distance at the flange 139, roll down the top thereof and fall off the edge flange 143 through a relatively short distance onto the liquid surface at L tending to create little splash. Any splash so created is, in any event, obstructed by the overlying, interleaved flanges 139 and 141 and so any droplets resulting from such splash cannot become reentrained in the steam flow and rise to the duct 43. It will be noted that the flanges 139 and 141 extend the full width of the casing 25 as indicated for the former in FIG. 4.

The duct 43 extends through an opening 151 in the vertical baffle 27 near the top of the latter and is secured by welding thereto. The leftward, or inlet, end of the duct 43 is spaced close above flange 141 but does not extend the full leftward extent thereof. For convenience in construction, the duct 43 is formed as a trough of inverted substantially trapezoidal cross section which permits, as seen in FIG. 5, the top edges of the side walls 153 of the trough to terminate substantially at the inner wall surfaces of the center braced thereagainst. A plate-like roof 154 (FIG. 2) covers the leftward part of duct 43, to the left of baffle 27, to prevent any possibility of condensate droplets, as may form on the inside of the top casing wall 38, from dropping into the vapor stream passing through the duct. If desired, such roof 154, which is spaced somewhat under the casing top wall 38, may be convexly upwardly rounded or otherwise provided with a slope for runoff of any condensate droplets which may fall thereon, in a direction away from the open leftward end of the duct 43.

The portion of the duct protruding rightwardly from the baffle 27 has an open top (as seen in FIGS. 2 and 5) to allow the probe 51 to depend freely thereinto and hence into the vapor stream passing rightwardly through the duct.

In the preferred embodiment shown, the probe 51 is substantially J-shaped in profile (FIGS. 2 and 6). More particularly, the intermediate portion 156 of the probe depends from the fitting 52 but at the bottom thereof is formed with a recurved hook 157 such that its end 158 extends upward close to the lower part of the depending portion 156. The width W of the J-shaped probe is less than the inside diameter of the hole in the casing receiving fitting 52 for ready insertion and removal of the probe with respect to the casing. The hook portion 157 lies close spaced above the bottom of the duct and the upward extending probe end 158 is more or less centrally located in the cross section of the duct. In this way, any droplets of condensate forming on the probe tube 66 will tend to run downward to collect at the bottom of the hook 157, and hence away from the end of the probe containing the thermocouple 59 and heater 61. In this way, water droplets do not tend to collect at the thermocouple and heater. This avoids distortion of measurement by the need to heat a droplet of water in the region of the probe end or the tendency of such a droplet to change the cooling characteristic of the steam flow on the probe end. The sensing end 158 of the J-shaped probe 51 preferably is upstream of the depending part so as not to be masked thereby.

The rightward, outlet end of duct 43 overlaps and lies close spaced above a substantially horizontal baffle 162 (FIGS. 2 and 5) which extends rightwardly to the end of end cap 102 and laterally the full width of the end cap 102. An end flange 164 angles downward and leftward from the free edge of the baffle 162 into close spaced relation from the vertical baffle 27. Baffle 162 and end flange 164 preclude any tendency of water from the condensate bath L, spaced therebelow, to be splashed, by any cause, upward and into the duct 43 in the region of the probe 51. If desired, the horizontal baffle 162 may be inclined somewhat downwardly away from its attachment to end cap 102 to assist runoff of any water droplets which, in rare instances, may happen to form or fall thereon.

In the preferred embodiment shown in FIGS. 2 and 5, there is provided a device 170 for limiting, or clipping, sudden increases, or pulses, in flow through the separator, due to sudden and substantial pulses in pressure in the steam line outside the separator 24. Such a pulse, in the form of a sudden, pulselike, drop in pressure at the outlet side of the separator 24 may be caused by a brief opening of the condensate outlet of the steam trap 20. This may be a particular problem in a low-flow system having an oversized steam trap (oversized for example by a factor of 10 to 100 times). In such a system, it may be usual, for example to have a one to ten pound per hour steam and condensate flow but spikes up to 100 pounds or so per hour may occur when the trap momentarily opens.

In the absence of the device 170, hereafter described, the result would be a correspondingly great increase in the flow through the separator, tending to overtax its ability to remove condensate droplets from the steam flow past the probe 51 and hence tending to create substantial error in the sensing output of the probe and hence in the reading of the output device 72. The outlet device 170 serves to clip, or greatly reduce the amplitude of, the resulting momentary increase, or spike, in the flow through the separator 24. An outlet tube 171 forms the outer shell of the device 170. The outlet tube 171 is fixed (as by welding or the like) to the outlet fitting 107 and extending into the outlet chamber 32. If desired, the tube 171 can be integrated as part of an outlet fitting or may indeed extend outward from the casing thereinto. However, it is more convenient from the standpoint of compact installation of the separator 24 to locate the tube 171 within the casing as shown.

The device 170 includes, in axially spaced relation within the outlet tube 171, a plurality of disks 173, 174 and 175 which extend across and block the full cross-sectional area of the tube 171. It is convenient to fix the disks 173-175 in place in the tube 171 by providing the bore of the tube with increasing diameter stepped portions toward the leftward end thereof, one of said stepped portions being indicated at 177. The disks 173-175 are thus of progressively decreasing diameter to be seated, by a press fit, into the correspondingly progressively narrowed diameter stepped portions 177. Each disk is provided with a hole, or flow port, 181. Normally there will be at least two such disks 173-175 and there may be more than three, but three as shown is normally sufficient. It will be understood that the disks operate in concert with each other to clip such a spike in flow rate.

Operation of the outlet device 170 may be illustrated by the following example. Assume that normal flow through the outlet chamber 32 is one cubic foot per minute of steam plus condensate at a pressure of 100 p.s.i. with a normal pressure at outlet opening 34 of 99 p.s.i. Assume further that a momentary pressure drop, or downward spike, to 50 p.s.i. occurs at outlet opening 34. In the absence of the device 170, this would normally cause a great surge in flow rate through the separator 24, such as a surge to 40 cubic feet per minute. However, the device 170 avoids this surge as follows. At the time of the downward pressure spike at outlet opening 34, the pressure drop across the disk 173 starts to increase and some of the liquid passing through the hole 181 therein will tend to flash to steam as it passes into the space between baffles 173 and 174. With the steam flow rate of one cubic foot per minute upstream of the disk at 173, this flashing tends to increase the steam flow rate between disks 173 and 174, for example to 1.2 cubic feet per minute. Similarly, some liquid in the space between disks 173 and 174 tends to flash the steam as it passes through the hole in disk 174, such that flow rate in the space between disks 174 and 175 may be 1.5 cubic feet per minute. Similarly, in view of the small diameter of the hole in disk 175, some of the liquid passing therethrough may tend to flash to steam and a flow of 2.2 cubic feet per minute may be found at the outlet 34, with virtually no increase from the normal flow rate of one cubic foot per minute at the upstream side of initial disk 173. In concert with this flow characteristic, the disks 173-175 set up a series of gradual pressure drops therebetween to isolate the normally 100 p.s.i. pressure in chamber 32 from the sudden downward spike to 50 p.s.i. at outlet opening 34. Accordingly, the sudden downward spike to 50 p.s.i. at outlet 34 may only result in a drop to 75 p.s.i. between disks 174 and 175, a drop to only 90 p.s.i. between disks 173 and 174 and virtually no drop from the prior normal 100 p.s.i. in the chamber 32.

Thus, in view of the blocking of the outlet path through opening 34 by the multiple disks in series, the provision of only a small diameter hole in each, and the space between each into which a portion of liquid passing through the hole can flash to steam, the net result is that in the midst of such a downward pressure spike at outlet 34, the pressure drop appears as progressively smaller pressure drops from space to space between the disks 173-175 and little if any change occurs in pressure or flow rate through the casing 25, such that the separation of steam from condensate is not impaired and steam flow rate past the probe 51 is substantially unaffected.

On the other hand, the disks 173-175 do not interfere with application of slowly changing conditions outside the casing to the pressure and flow rate within the casing, such that the device 170 does not impair the ability of the probe 51 to change output in response to a gradually increasing or continuing leakage of steam from a downstream steam trap.

It will be understood that the device 170 can readily be scaled up or down to fit a wide range of sizes of separator and hence a wide range of steam-condensate flow rates.

Although the separator 24 is described above in terms of installation in a horizontal or approximately horizontal pipeline, it will be appreciated that the pre-separator 111, probe 51 and outlet device 170 can readily be used in separators in vertical pipelines.

Indeed, the particular separator 24 shown in FIG. 2 can be adapted to use in both horizontal and vertical pipelines. For example with inlet 33 above outlet 34, small drain holes 201, 202 and 203 in the right edges of the flanges 138 and 141 and baffle 162 prevent trapping of condensate therebehind. The interior (leftward) end of outlet tube 171 is spaced to the right of (below when installed in a vertical pipeline) the rightward end of duct 43. The liquid level $L_v$ for such vertical orientation of the axes of the inlet and outlet openings 33, 34 would thus be on the "top" of the tube 171, namely in the plane of the open interior end thereof (leftward in FIG. 2). A flange 206 extends from the baffle 27 (at the top of lower opening 41) rightward beyond the interior end of tube 171. Thus, in a generally vertical installation, flange 206 penetrates the liquid surface at $L_v$ and therewith blocks steam flow therepast from inlet 33 to outlet 34. In this way the disclosed separator can be used in the FIG. 2 position and in positions tilted clockwise therefrom by up to 90° or more.

Structure of the casing 25 in initially separate parts 101-103 facilitates manufacture of the FIG. 2 apparatus by permitting preassembly of pre-separator 111 on inlet cup 101, plate and flange structure 136, 138, 139 on center shell 103, flange 141 and duct 43 on baffle 27, and baffle 162 and outlet device 170 on outlet cup 102. Assembly then can be completed by welding baffle 27 between cup 102 and shell 103 and then welding cup 101 to the composite 103, 27, 102.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for measuring the rate of flow of the vapor phase of a fluid flow, in the presence of an unknown quantity of a liquid phase in the fluid flow, comprising:
   a hollow separator casing divided into inlet and outlet chambers by a baffle;
   an inlet opening in the casing wall for admitting said fluid flow into said inlet chamber;
   an outlet opening for discharging said fluid flow from said outlet chamber;
   means defining a liquid flow path from said inlet chamber to said outlet chamber and including a liquid flow opening through said baffle;
   means defining a separate vapor flow path from said inlet chamber to said outlet chamber, said vapor flow path being spaced above the normal liquid level in said casing;
   vapor flow responsive means at said vapor flow path to sense the rate of vapor flow therethrough;
   wherein the improvement comprises
   an inlet tube communicating with said inlet opening and facing into said casing, said inlet tube comprising an inlet segment extending from said inlet opening into said casing an outlet segment transversely offset from said inlet segment and extending generally longitudinally of said casing near a peripheral wall thereof and spaced from the liquid flow opening through said baffle, said inlet tube having an intermediate portion connecting said inlet and outlet segments and with ends angled with respect thereto, the free end of said outlet segment being closed;
   wall means sealing the interior of said tube from the interior of said casing except at reduced diameter holes through said wall means, the diameter of said holes being less than the inside diameter of said tube at said wall means, said wall means of said inlet tube comprising the portion of the peripheral wall of said outlet segment facing the peripheral wall of said casing, which portion is provided with a series of said holes facing toward said peripheral wall of said casing and of progressively smaller diameter toward the closed end of said outlet segment, said holes being spaced downstream of the intermediate portion of said inlet tube, the connection of said inlet segment and outlet segment being arranged to deflect fluid flow away from at least the upstream ones of said holes.

2. The apparatus of claim 1, in which said vapor flow responsive means comprises a probe member of J-shaped profile extending from a port into the casing and terminating in a hook-shaped portion, the hook-shaped terminating portion having a free end extending generally upward from the bight of said hook-shaped portion, said probe member including a temperature sensor at the upper extremity of said free end and a heater between said upper end extremity and said bight, said hook-shaped portion being disposed loosely in the flow through said vapor port, with the upward extending free end of said hook-shaped portion upstream of the remainder of said hook-shaped portion, said probe member containing conductors for connecting said temperature sensor and heater to means for monitoring said sensor and providing energy to said heater to heat same.

3. The apparatus of claim 1, including an outlet tube which extends into said casing from said outlet opening, a plurality of disks spaced axially along said oulet tube and extending transversely thereof to block the cross section thereof, each of said disks being provided with a hole, the diameter of the last-mentioned hole being a small fraction of the diameter of the corresponding disk.

4. The apparatus of claim 1, in which the cross-sectional area of said holes decreases toward said free end of said outlet segment, to the extent that the cross-sectional area of each successive hole is approximately one-half the cross-sectional area of the preceding hole.

5. The apparatus of claim 4, in which the peripheral wall of said casing is substantially cylindrical, said outlet segment being radially offset from the axis of said casing and toward the peripheral wall of said casing, with said series of holes facing away from said axis of said casing and toward the adjacent peripheral wall, such that liquid vented from said holes engages the opposed portion of said casing peripheral wall and said casing peripheral wall is adapted to flow droplets of said liquid on the interior surface thereof away from said outlet segment and toward a low point in said casing.

6. An apparatus for measuring the rate of flow of the vapor phase of a fluid flow, in the presence of an unknown quantity of a liquid phase in the fluid flow, comprising:
a hollow separator casing divided into inlet and outlet chambers by a baffle;
an inlet opening in the casing wall for admitting said fluid flow into said inlet chamber;
an oulet opening for discharging said fluid flow from said outlet chamber;
means defining a liquid flow path from said inlet chamber to said oulet chamber;
means defining a separate vapor flow path from said inlet chamber to aid oulet chamber, said vapor path being spaced above the normal liquid level in said casing;
vapor flow responsive means at said vapor flow path to sense the rate of vapor flow therethrough;
said vapor flow responsive means including a probe member of J-shaped profile extending into the casing and terminating in a hook-shaped portion, the hook-shaped terminating portion having a free end extending generally upward from the bight of said hook-shaped portion, said probe member including a temperature sensor and a heater at said free end, said hook-shaped portion being disposed loosely in the flow through said vapor path, with the free end, said hook-shaped portion upstream of the remainder of said hook-shaped portion.

7. An apparatus for measuring the rate of flow of the vapor phase of a fluid flow, in the presence of an unknown quantity of a liquid phase in the fluid flow, comprising:
a hollow separator casing divided into inlet and outlet chambers by a baffle;
an inlet opening in the casing wall for admitting said fluid flow into said inlet chamber;
an outlet opening for discharging said fluid flow from said outlet chamber;
means defining a liquid flow path from said inlet chamber to said outlet chamber and including a liquid flow opening through said baffle;
means defining a separate vapor flow path from said inlet chamber to said outlet chamber, said vapor flow path being spaced above the normal liquid level in said casing;
vapor flow responsive means at said vapor flow path to sense the rate of vapor flow therethrough;
wherein the improvement comprises
an inlet tube communicating with said inlet opening and facing into said casing, said inlet tube having a peripheral wall sealing the interior of said tube from the interior of said casing except at reduced diameter holes through said peripheral wall, the diameter of said holes being less than the inside diameter of said tube at said peripheral wall, said holes through the peripheral wall being of progressively reduced cross-sectional area toward the downstream end of said tube for pre-separating at least a portion of steam and condensate entering said inlet opening;
a further tube at said outlet opening, and wall means dividing said outlet tube into successive compartments which communicate in sequence to a relatively small diameter hole in each successive wall means.

8. An apparatus for measuring the rate of flow of the vapor phase of a fluid flow, in the presence of an unknown quantity of a liquid phase in the fluid flow, comprising:
a hollow separator casing divided into inlet and outlet chambers by a baffle means;
an inlet opening in the casing wall for admitting said fluid flow into said inlet chamber;
an outlet opening for discharging said fluid flow from said outlet chamber, said baffle means being open at a location spaced below said inlet and outlet openings for liquid flow therepast from said inlet chamber to said outlet chamber;
means defining a vapor port through said baffle means above said inlet opening and outlet opening for vapor flow from said inlet chamber to said outlet chamber, said vapor port being spaced above the normal liquid level in said casing;
vapor flow responsive means including probe means located at said vapor port to sense the rate of vapor flow therethrough;
first and second transverse baffles spaced axially from said inlet and outlet openings, respectively, and from each other, said first baffle terminating above a liquid level plane extending between said inlet and outlet openings for defining a portion of the steam path between the inlet and outlet openings, said second baffle extending downward through said liquid level plane but having an opening therethrough below said liquid level plane for defining a liquid passage between said inlet and outlet openings;

said second baffle having said vapor port therethrough at a level spaced above said liquid level plane, said vapor port being defined by an axially elongate trough communicating through said second baffle, a roof on the trough at the upstream side of said second baffle, said first and second baffles supporting generally axially extending flanges which are spaced from each other and wherein at least of the flanges on said first baffle overlap a corresponding flange on the second baffle to provide a sinuous steam flow path from said inlet opening to the upstream end of said trough, a further baffle extending axially from said downstream end of said casing toward said second baffle in spaced relation therefrom, said further baffle being spaced between the downstream end of said trough and said outlet opening for defining a sinuous steam flow path from said trough to said outlet opening, said casing being defined by substantailly cup-shaped, opposing end caps joined by a cylindrical intermediate section, said second baffle being fixed to said casing at the joinder of said intermediate portion and outlet end cap, said separator casing being usuable with said inlet and outlet openings being spaced both horizontally and vertically, said further baffle and the ones of said flanges extending toward the inlet end of the casing being provided with drainage holes adjacent the edges thereof nearest the outlet end of the casing for preventing entrapment of condensate in the vertical orientation of said casing.

9. An apparatus for measuring the rate of flow of the vapor phase of a fluid flow, in the presence of an unknown quantity of a liquid phase in the fluid flow, comprising:

a hollow separator casing divided into inlet and outlet chambers by a baffle;

an inlet opening in the casing wall for admitting said fluid flow into said inlet chamber;

an outlet opening for discharging said fluid flow from said outlet chamber;

means defining a liquid flow path from said inlet chamber to said outlet chamber;

means defining a separate vapor flow path from said inlet chamber to said outlet chamber, said vapor flow path being spaced above the normal liquid level in said casing;

vapor flow responsive means at said vapor flow path to sense the rate of vapor flow therethrough;

an inlet tube extending from said inlet opening into said casing and having a peripheral wall facing the peripheral wall of the casing and provided with a series of holes facing toward said casing peripheral wall, said inlet tube being provided with a series of flow deflecting surfaces spaced one after the other therealong, said flow deflecting surfaces being angled with respect to each other to produce a series of angular deflections of the direction of fluid flow through said inlet tube, said series of holes being located in said inlet tube downstream of said deflecting surfaces with the adjacent preceding deflecting surface being oriented to tend to deflect liquid flow away from upstream ones of said holes while permitting steam flow through the latter.

* * * * *

UNITED STATES PATENT AND TRADEMARK OFFICE
CERTIFICATE OF CORRECTION

PATENT NO. : 4 468 962
DATED : September 4, 1984
INVENTOR(S) : David A. Keech et al It is certified that error appears in the above-identified patent and that said Letters Patent is hereby corrected as shown below:

Column 12, line 44; change "casing an" to ---casing, an---.
Column 13, line 55; change "aid oulet" to ---said outlet---.
Column 14, line 1; change "end, said" to ---end of said---.
Column 15, line 27; change "usuable" to ---usable---.
Column 16, line 32; change "from upstream" to ---from the upstream---.

Signed and Sealed this

Twelfth Day of March 1985

[SEAL]

Attest:

DONALD J. QUIGG

*Attesting Officer*    *Acting Commissioner of Patents and Trademarks*